United States Patent [19]

Burn

[11] 4,120,677
[45] * Oct. 17, 1978

[54] METHOD FOR MAKING A GLASS-REACTED-CERAMIC

[75] Inventor: Ian Burn, Williamstown, Mass.

[73] Assignee: Sprague Electric Company, North Adams, Mass.

[*] Notice: The portion of the term of this patent subsequent to Jan. 3, 1995, has been disclaimed.

[21] Appl. No.: 735,656

[22] Filed: Oct. 26, 1976

[51] Int. Cl.$^2$ .............. C03B 23/20; C03B 32/00; H01B 3/00; C03C 21/00

[52] U.S. Cl. ............ 65/18; 65/30 R; 65/32; 65/33; 106/73.3; 106/73.31; 252/63.2; 252/63.5; 264/61; 264/65

[58] Field of Search ............ 106/73.31, 73.3, 46; 65/18, 32, 30 R, 33; 264/61, 65; 252/63.2, 65.3

[56] References Cited

U.S. PATENT DOCUMENTS

| | | | |
|---|---|---|---|
| 2,402,516 | 6/1946 | Wainer | 106/73.31 X |
| 2,855,317 | 10/1958 | McQuarrie et al. | 106/46 X |
| 2,966,420 | 12/1960 | Prokopowicz et al. | 106/73.31 X |
| 3,473,958 | 10/1969 | Waku | 106/73.31 X |
| 3,489,845 | 1/1970 | Landron | 65/18 X |
| 3,523,028 | 8/1970 | Prokopowicz | 106/73.31 |
| 3,577,487 | 5/1971 | Sanchez et al. | 264/61 X |
| 3,600,484 | 8/1971 | Smoke et al. | 264/65 |
| 3,704,266 | 11/1972 | Ueoka et al. | 264/61 X |
| 3,885,941 | 5/1975 | Maher | 106/73.31 |
| 3,920,781 | 11/1975 | Eror et al. | 264/65 X |
| 3,969,252 | 7/1976 | Utsumi et al. | 106/73.31 |
| 4,026,811 | 5/1977 | Readey et al. | 252/63.2 |

OTHER PUBLICATIONS

Multiple Curie Point Dielectrics, R. A. Delaney et al., Proceedings of the Electronic Components Conference, 1967, pp. 318-329.

Primary Examiner—S. Leon Bashore
Assistant Examiner—Frank W. Miga
Attorney, Agent, or Firm—Connolly and Hutz

[57] ABSTRACT

Powders of barium titanate, of an alkaline-earth-zirconate and of a cadmium containing glass are mixed with an organic binder to form a body that is subsequently fired at from 1800° F to 2050° F to make a glass-reacted-ceramic dielectric having a glass phase intermixed with a single titanate-zirconate phase. The omission of the conventional calcining step to obtain the single phase titanate-zirconate results in a substantial cost saving.

6 Claims, 1 Drawing Figure

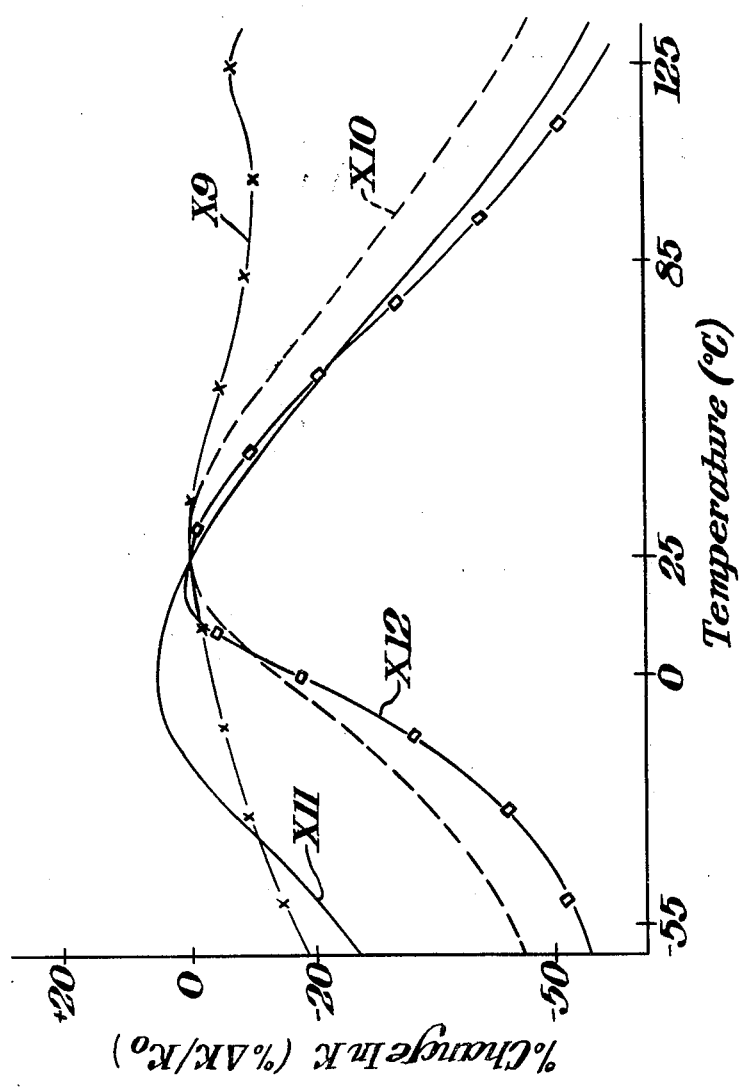

METHOD FOR MAKING A GLASS-REACTED-CERAMIC

BACKGROUND OF THE INVENTION

The present invention relates to a method for forming a glass-reacted-ceramic dielectric material and more particularly to such a method wherein cadmium from the glass reacts with the ceramic during the firing to maturity of the dielectric.

In the preparation of such low firing two phase (glass and ceramic) dielectric materials, it is conventional to pre-react the basic ceramic materials, such as barium titanate and calcium zirconate by prefiring or calcining at a high temperature, namely above 2200° F., to form a solid solution thereof and thus to form a single phase ceramic such as an alkaline-earth titanate-zirconate. This single phase ceramic is then conventionally pulverized, mixed with a glass powder, usually in a suspension medium, deposited on a substrate or in a multi-layer stack and fired to maturity at a temperature less than about 2050° F. Such a method is described in the patent to G. Maher U.S. Pat. No. 3,885,941 issued May 27, 1975 and assigned to the same assignee.

Although it is known to react two different alkaline-earth titanates in a glass flux at temperatures lower than 2050° F., it has hitherto been believed that the above noted high temperature calcining step was necessary to achieve a solid solution of two basic but distinctly different ceramic materials such as titanates and zirconates.

It is an object of the present invention to provide a method for forming a glass-reacted-ceramic dielectric material wherein a mixture of two different basic ceramic materials and glass is fired to maturity achieving a solid solution of said ceramic materials that is intermixed with glass.

It is a further object of this invention to provide a method for forming a glass-reacted-ceramic dielectric material from at least two distinctly different ceramic materials and a glass, without calcining said distinctly different ceramic materials prior to mixing and firing to maturity with glass.

It is a further object of this invention to provide a low cost method for making a glass-reacted-ceramic dielectric material having a high dielectric constant at the Curie temperature.

It is a further object of this invention to provide a low cost method for making a glass-reacted-ceramic dielectric material having a Curie temperature of about 25° C.

SUMMARY OF THE INVENTION

A method for making a cadmium containing glass-reacted-ceramic dielectric body comprises mixing in an organic suspension medium the finely ground prefired powders of barium titanate, an alkaline-earth-zirconate and a cadmium containing glass. A body is formed of the slip mixture, which is dried and then fired at between 1800° F. and 2050° F. to produce a mature glass-reacted-ceramic body. The low temperature firing surprisingly causes the zirconate to form a solid solution with the titanate and also causes some of the cadmium ions from the glass to diffuse into and react with the titanate-zirconate. The effect of the cadmium reaction is to enhance grain growth of the titanate-zirconate phase and to shift the Curie temperature downwardly. This produces a glass-reacted-ceramic body having a ceramic phase consisting in a cadmium containing barium-titanate-zirconate that is intermixed with glass, which exhibits a high dielectric constant at room temperature and provides other excellent dielectric properties. The term high dielectric constant is used herein to mean values greater than 3000 at 25° C. unless otherwise noted.

The mechanism by which the zirconate and titanate components form a solid solution at the low temperature firing is believed to derive from the strong enhancement of grain growth by cadmium in the glass which in turn enables the zirconate to be continuously incorporated in the growing titanate crystal.

The dielectric materials as produced by the method of this invention are particularly useful for making monolithic capacitors having low cost electrodes such as silver palladium alloys as is explained in U.S. Pat. No. 3,619,220 issued Nov. 9, 1971 and assigned to the same assignee. The method of the present invention makes it possible to omit the conventional calcining or prefiring step by which the basic ceramic components of heretofore known glass-ceramic dielectric materials are caused to form a solid solution and single phase ceramic at high temperatures. In barium titanate ceramics the diffusion of large cations such as calcium and strontium occurs readily. This is because large cation vacancies are quite common in the titanate lattice. Diffusion of small cations is generally considered much more difficult as in the example of replacing some of the titanium with zirconium. It has been found, however, that a sufficient solid solution can indeed be obtained without the conventional precalcining step by the method of this invention to achieve the good electrical properties and high dielectric constants above mentioned. Omission of the calcining step leads to a substantial reduction in the cost of making the glass-reacted-ceramic dielectric material. It also advantageously reduces the total energy requirements of the process.

BRIEF DESCRIPTION OF THE DRAWING

The FIGURE shows a graph of the percent change in dielectric constant (K) as a function of operating temperature for four experimental glass ceramic bodies.

DESCRIPTION OF THE PREFERRED EMBODIMENTS

A slip suspension was prepared by adding particles of barium titanate and particles of a cadmium containing glass in an organic binder. The glass was composed of 35.5% CdO, 24.5% $Bi_2O_3$, 24.8% PbO, 4% ZnO, 5.2% $B_2O_3$, 4.9% $SiO_2$, and 1% $Al_2O_3$ by weight. The glass amounted to 11.5% by weight of the solids in the slip mixture. After milling for 12 hours in a 200 cc porcelain mill to thoroughly mix and reduce the solids to particles on the order of 1 micron diameter, the slip was cast on a glass plate using a standard doctor blade technique, and when dry was cut into small squares. These squares were fired at about 2025° F. after which silver electrodes were applied to the opposite major faces of each square to form disc type capacitors and to permit the evaluation of the glass-ceramic dielectric material.

These capacitors, being designated Example 1, were made as a reference and control sample against which the evaluation of modifications in the ceramic composition might be made. The Curie temperature (Tc) of the material is seen in Table I to be quite high and the room temperature dielectric constant is quite low, namely about 1000.

The remainder of the examples for which composition and Curie temperature are shown in Table I, each have 11.5 weight percent of the glass composition used in Example I, but have varying amounts of basic ceramic modifiers added. The quantity of the basic ceramic modifier added in each of the Examples 2 through 9 is shown both as the weight percent of the total weight of the glass-ceramic dielectric material and also as mole percent taken only relative to the ceramic components.

The method for making these modified dielectric materials includes the steps used in making the control material of Example 1. However, to the slip containing particles of barium titanate, and the cadmium containing glass there were added particles of the modifier composition, all three of which were then milled, cast and fired at 2025° F. for about 2 hours.

TABLE I

| Example | Type of Modifier | $BaTiO_2$ (wt.%) | Modifier (Wt. %/mole %) | Tc °C |
|---|---|---|---|---|
| 1 | — | 88.5 | 0/0 | 144 |
| 2 | $CaZrO_3$ | 85.8 | 2.7/3.9 | 100 |
| 3 | $CaZrO_3$ | 83.2 | 5.3/7.6 | 28 |
| 4 | $CaZrO_3$ | 77.0 | 11.5/16.3 | −55 |
| 5 | $BaZrO_3$ | 82.5 | 6.0/5.7 | 63 |
| 6 | $BaZrO_3$ | 80.6 | 7.9/7.6 | 0 |
| 7 | $SrZrO_3$ | 83.6 | 4.9/5.6 | 38 |
| 8 | $SrZrO_3$ | 83.0 | 5.5/6.4 | 22 |
| 9 | $ZrO_2$ | 84.8 | 3.7/7.6 | * |

*double peak

Surprisingly it was found that in all but one of these examples having modifiers added to the ceramic and glass slip, a solid solution of the barium titanate and the modifier was achieved at the low firing temperature of 2025° C. In each of the examples 2 through 8, an alkaline-earth titanate-zirconate ceramic phase was formed having a single dominant peak in the characteristic curve of dielectric constant versus operating temperature.

From other experiments and from the evidence presented in the above-noted U.S. Pat. No. 3,885,941, the glass composition employed in Examples 2 through 8 is about optimum for achieving a high dielectric constant at room temperature, although an increase of any one of the constituent glass oxides (except bismuth) of as much as 100% and a decrease in any one of these constituents (except cadmium) by as much as about 50% would represent suitable glass compositions for use in this invention. The bismuth oxide should not exceed about 30 wt.% and the cadmium oxide is preferably not less than about 30 wt.% of the glass to obtain a strong synergism at firing between the cadmium and the reacting titanate and zirconate, as described earlier. The total amount of the glass used in the glass ceramic mixture should not be less than about 10.5 wt.% because the glass-ceramic would not densify properly at the low firing temperatures used. Larger amounts of glass than about 15 wt.% would prevent the achievement of dielectric constants as high as 3000. It is also apparent from the data in Table I that the zirconate modifier may vary over the range of from about 4 to 16 mole percent of the titanate-zirconate mixture to provide a range of useful dielectrics having a wide spectrum of Curie temperatures.

In the drawing the characteristic curve X9 of dielectric constant versus temperature for the material of Example 9, having the zirconia modifier, shows two peaks, one at 30° C. and the other at 125° C. Clearly the zirconia remained essentially a separate and distinct phase within this dielectric material. Zirconia is thus an unsuitable modifier for use in the method of this invention although the rather flat temperature coefficient of capacitance suggests that this composition may be useful for applications calling for low TCC and lower dielectric constants.

Small molar amounts of the alkaline-earth modifiers are shown to have a substantial depressing influence on the Curie temperature in the dielectric material produced by the method of this invention as is shown in Table II. This effect is similar to that achieved by the method taught by G. Maher in patent application Ser. No. 690,225, filed May 26, 1976 and assigned to the same assignee. For example, the material of this patent containing 4.5 mole percent barium zirconate has a Curie temperature of about +5° C., while the material of the present invention (Example 6) having 7.6 mole percent barium zirconate exhibits about the same Curie temperature, namely 0° C. Thus, a little more of the zirconate modifier is required in the method of the present invention to achieve the same depressing effect on the Curie temperature. However, it is disclosed in the patent application that a barium titanate without the cadmium containing glass and with about 7.6 mole percent of a barium zirconate modifier will exhibit a Curie temperature as high as 60° C. It is apparent that in the method of the present invention the zirconate modifier and cadmium from the glass together will effectively react with the barium titanate during the firing to maturity of the glass-ceramic body to cause the substantial lowering of the Curie temperature.

TABLE II

| Example | Type of Modifier | $BaTiO_2$ (Wt. %) | Modifier Wt. %/mole % | K | DF at .5 Volt per mil (%) | IR at 25° C F | at 125° C F | Tc |
|---|---|---|---|---|---|---|---|---|
| 10 | $CaZrO_3$ | 83.2 | 5.3/7.6 | 3850 | 3.9 | 3850 | 245 | 28 |
| 11 | $BaZrO_3$ | 80.6 | 7.9/7.6 | 3150 | 1.4 | 10 | 120 | 0 |
| 12 | $SrZrO_3$ | 83.0 | 5.5/6.4 | 4500 | 2.6 | 4450 | 85 | 22 |
| 13* | $SrZrO_3$ | 83.0 | 5.5/6.4 | 4150 | 2.0 | 8400 | 200 | 25 |
| 14** | $SrZrO_3$ | 83.0 | 5.5/6.4 | 4300 | 1.4 | 10800 | 370 | 25 |
| 15*** | $SrZrO_3$ | 83.0 | 5.5/6.4 | — | — | — | — | — |

*ceramic with 0.2 $UO_3$ by weight (0.2 mole %)
**ceramic with 0.1 $MnCO_3$ by weight (0.3 mole %)
***ceramic with 0.2 $NbO_{2.5}$ by weight (0.4 mole %)

The most promising of the dielectric materials from Examples 2 through 8 for use as high K bodies (K>3000 at 25° C.) were those of Examples 3, 6 and 8. These same materials were used to make the hand screened monolithic capacitors of Examples 10, 11 and 12, respectively.

These monolithic capacitors were made by first mixing the finely ground powders of barium titanate, the alkaline-earth zirconate modifier and the cadmium containing glass in an organic binder. A first layer of this slip was hand screened on a glass substrate and dried. A 70% Ag-30% Pd electrode was screen deposited on the dried slip layer. A second layer of the glass-ceramic slip was hand screened over the electrode, another electrode film deposited in the same manner as the first and a third slip layer was applied over the second electrode. This stack was removed from the glass substrate and fired at 2025° F. for about 2 hours. Silver terminations were provided at either end of the fired stack making contact with each of the two buried electrodes, respectively.

The Curie temperature and characteristic temperature curves of the hand screened monolithic capacitors were the same as for the disc capacitors having the same start materials. The characteristic temperature curves for Examples 10, 11 and 12 are shown in FIG. 2. Other electrical characteristics for these examples are given in Table II.

The material of Example 12 is preferred for the above noted high K applications but it was seen that the DF was higher and the high temperature insulation resistance (IR) was lower than desired. Small quantities of dopants were added to the slip used in Example 12, namely uranium oxide in Example 13, manganese carbonate in Example 14, and niobium pentoxide in Example 15. The manganese dopant caused no change in the characteristic temperature curve (X-12 in FIG. 2) and no change in dielectric constant at 25° C., but was most effective and is preferred for reducing the DF and increasing the high temperature IR as is seen from the data in Table II. On the other hand, the niobium additive prevented complete sintering at the low firing temperature of 2025° C. and no useful dielectric material resulted in Example 15. It has thus been concluded that no more than about 0.2 mole percent of the niobium compound should be added to the titanate, zirconate and glass mixture. Therefore, in the method of this invention, to obtain any significant quantity of niobium in the ceramic phase, it would be necessary to calcine the niobium with at least one of the ceramic start materials prior to mixing with the glass and firing the body to maturity; and this, of course, defeats a major purpose of the invention, namely to eliminate the usual calcining step and reduce processing costs.

The grains of the ceramic phase were found to have grown to greater than 20 microns diameter as determined by a standard sectioning and electron microscopy technique. The grains were further analyzed by a standard electron probe method and found to contain about 0.5 weight percent cadmium.

What is claimed is:

1. A method for making a glass-reacted-ceramic body having a high dielectric constant at 25° C. comprising mixing in a suspension medium the three finely ground prefired powders consisting essentially of a powder of barium titanate, powders of an alkaline-earth-zirconate and powder of a cadmium containing glass; forming a body of said powdered mixture; and firing said body between 1800° F. and 2050° F. to react said titanate powder with said zirconate powder and to form an alkaline-earth-titanate-zirconate phase that is intermixed with a glass phase.

2. The method of claim 1 wherein said mixture additionally contains a dopant selected from oxides and carbonates of manganese and uranium.

3. The method of claim 2 wherein said dopant is a manganese compound amounting to about 0.85 mole percent of said titanate plus said zirconate.

4. The method of claim 1 wherein said alkaline-earth-zirconate is strontium zirconate and amounts to about 6.4 mole percent of said titanate plus said zirconate.

5. The method of claim 1 wherein said forming of said body comprises depositing a first layer of said titanate zirconate glass mixture on a substrate, applying an electrode film to the surface of said first layer, depositing and applying additional layers and electrode films, respectively over said first electroded layer, and drying said layers to produce a monolithic ceramic capacitor.

6. The method of claim 5 wherein said electrode film contains silver and palladium in the ratio of about 70 to 30 parts by weight.

* * * * *

UNITED STATES PATENT OFFICE
CERTIFICATE OF CORRECTION

Patent No. 4,120,677          Dated October 17, 1978

Inventor(s) Ian Burn

It is certified that error appears in the above-identified patent and that said Letters Patent are hereby corrected as shown below:

Column 3, line 34, "2025°C" should read -- 2025°F --

Column 5, line 15, delete "FIG. 2" and insert -- the FIG. --

Column 5, line 26, within the parenthesis, delete "FIG. 2" and insert -- the FIG. --

Column 5, line 32, "2025°C" should read -- 2025°F --

Signed and Sealed this

Thirteenth Day of February 1979

[SEAL]

Attest:

RUTH C. MASON
Attesting Officer

DONALD W. BANNER
Commissioner of Patents and Trademarks